(12) United States Patent
Patil

(10) Patent No.: US 12,674,107 B2
(45) Date of Patent: Jul. 7, 2026

---

(54) SEPARATING CARBON DIOXIDE AND HYDROGEN FROM A MULTICOMPONENT GASEOUS STREAM

(71) Applicant: Saudi Arabian Oil Company, Dhahran (SA)

(72) Inventor: Pramod Dhanaji Patil, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 506 days.

(21) Appl. No.: 18/303,866

(22) Filed: Apr. 20, 2023

(65) Prior Publication Data

US 2024/0350965 A1      Oct. 24, 2024

(51) Int. Cl.
*C10L 3/10* (2006.01)
*B01D 47/02* (2006.01)
(Continued)

(52) U.S. Cl.
CPC ............ *C10L 3/108* (2013.01); *B01D 47/021* (2013.01); *B01D 53/0438* (2013.01); *B01D 53/0446* (2013.01); *B01D 53/1475* (2013.01); *B01D 53/1493* (2013.01); *B01D 53/18* (2013.01); *B01D 53/14* (2013.01); *B01D 53/1425* (2013.01); *B01D 53/185* (2013.01); *B01D 53/34* (2013.01); *B01D 53/62* (2013.01); *B01D 53/78* (2013.01); *B01D 2252/103* (2013.01); *B01D 2257/504* (2013.01); *C01B 3/32* (2013.01); *C01B 3/50* (2013.01); *C01B 3/52* (2013.01); *C10L 3/104* (2013.01); *F23J 15/022* (2013.01); *F23J 15/04* (2013.01); *Y02C 20/40* (2020.08)

(58) Field of Classification Search
None
See application file for complete search history.

(56) References Cited

U.S. PATENT DOCUMENTS

| | | |
|---|---|---|
| 4,075,310 A | 2/1978 | Fischer |
| 5,434,330 A | 7/1995 | Hnatow et al. |
| | (Continued) | |

FOREIGN PATENT DOCUMENTS

| | | |
|---|---|---|
| CN | 100493672 | 6/2009 |
| CN | 104289083 | 2/2016 |
| | (Continued) | |

OTHER PUBLICATIONS

Englezos et al., "Gas hydrates: A cleaner source of energy and opportunity for innovative technologies," Korean J. Chem. Eng., 2005, 22(5):671-681, 11 pages.
(Continued)

*Primary Examiner* — In Suk C Bullock
(74) *Attorney, Agent, or Firm* — Dinsmore & Shohl, LLP

(57) ABSTRACT

A system and a method separating $CO_2$ from a gas mixture using hydrates are provided. An exemplary method includes injecting a feed gas into a gas hydrate column through a feed gas line and producing hydrogen from a hydrogen outlet line. The method includes determining that water on trays in the gas hydrate column is saturated with $CO_2$ gas hydrates, closing valves on the feed gas line and the hydrogen outlet line, opening a valve leading to a carbon dioxide outlet line, lowering pressure in the gas hydrate column, and producing carbon dioxide from the carbon dioxide outlet line.

22 Claims, 4 Drawing Sheets

(51) Int. Cl.

| | |
|---|---|
| B01D 53/04 | (2006.01) |
| B01D 53/14 | (2006.01) |
| B01D 53/18 | (2006.01) |
| *B01D 53/34* | (2006.01) |
| *B01D 53/62* | (2006.01) |
| *B01D 53/78* | (2006.01) |
| *C01B 3/32* | (2006.01) |
| *C01B 3/50* | (2006.01) |
| *C01B 3/52* | (2006.01) |
| *F23J 15/02* | (2006.01) |
| *F23J 15/04* | (2006.01) |

(56)         References Cited

U.S. PATENT DOCUMENTS

| | | | |
|---|---|---|---|
| 6,372,023 B1 * | 4/2002 | Kiyono | C01B 32/50 |
| | | | 423/220 |
| 7,128,777 B2 | 10/2006 | Spencer | |
| 8,663,589 B2 | 3/2014 | Graville | |
| 9,981,848 B2 | 5/2018 | Ballaguet et al. | |
| 2007/0248527 A1 | 10/2007 | Spencer | |

| | | | |
|---|---|---|---|
| 2009/0260287 A1 * | 10/2009 | Lau | C10L 3/102 |
| | | | 422/162 |
| 2010/0021361 A1 | 1/2010 | Spencer | |
| 2010/0126180 A1 | 5/2010 | Forsyth et al. | |
| 2012/0111194 A1 | 5/2012 | Miyagawa et al. | |
| 2018/0178161 A1 * | 6/2018 | Mettler | B01D 53/62 |

FOREIGN PATENT DOCUMENTS

| | | |
|---|---|---|
| EP | 0045013 | 2/1982 |
| EP | 2023066 | 2/2009 |
| JP | 4684365 | 5/2011 |
| JP | 2014181141 | 9/2014 |
| WO | WO 2018118612 | 6/2018 |

OTHER PUBLICATIONS

Herzog et al., "Carbon Capture and Storage from Fossil Fuel Use," Encyclopedia of Energy, 2004, 1:1-11, 11 pages.

Koh et al., "Fundamentals and Applications of Gas Hydrates," Annu. Rev. Chem. Biomol. Eng., Published online as a Review in Advance on Mar. 8, 2011, 2:237-257, 23 pages.

* cited by examiner

SEPARATING CARBON DIOXIDE AND HYDROGEN FROM A MULTICOMPONENT GASEOUS STREAM

TECHNICAL FIELD

This disclosure relates to methods of in separating carbon dioxide and hydrogen from a multicomponent gaseous stream of products using gas hydrate-based separation technology.

BACKGROUND

Carbon dioxide ($CO_2$) capture is generally operated as a continuous process, which requires a significant amount of energy to operate. It contributes to around 70-90% of the total operating cost of the three-stage carbon capture and storage system that is commonly used for the reduction of $CO_2$ emissions. Current $CO_2$ capture employs adsorption, absorption, and membrane technologies that are low in efficiency and often require multiple stages. Gas hydrates are solid clathrates made up of gas molecules (guest), such as methane ($CH_4$), $CO_2$, nitrogen ($N_2$), and hydrogen ($H_2$), that are held within a cavity of hydrogen-bonded water molecules (host). They form under the favorable thermodynamic conditions of low temperature and high pressure, and they exhibit various structures.

Generally, $CO_2$ is captured from the effluent of power plants through either post or pre-combustion capture. Post-combustion capture refers to the treatment of flue gas before being released into the atmosphere. Pre-combustion capture refers to the capture of $CO_2$ from the fuel gas, which is the partially combusted fuel containing approximately 40% $CO_2$ and 60% $H_2$. The high $CO_2$ content in the fuel gas allows more efficient capture. Some of the chemical processes, such as a water gas shift reaction, produce fuel gas streams containing $CO_2$, $H_2$ and other gases. The existing amine-based adsorption processes for removing $CO_2$ from gases are costly and energy intensive, having a significant carbon footprint.

SUMMARY

An embodiment described herein provides a gas hydrate column. The gas hydrate column includes a column shell to be pressurized in a first stage of operation and depressurized in a second stage of operation. Bubble trays are disposed vertically in the column shell, wherein the bubble trays are configured to hold a level of water on each of the bubble trays. The gas hydrate column includes a feed gas inlet to feed a gas mixture into the column shell, where in the gas mixture is compressed and chilled to form $CO_2$ hydrates in the water on the bubble trays. A gas outlet is included to release non-hydrate forming gases during the first stage of operation and a gas outlet to release hydrate-forming gases during the second stage of operation.

Another embodiment described herein, provides a method for separating $CO_2$ from a gas mixture using hydrates. The method includes injecting a feed gas into a gas hydrate column through a feed gas line and producing hydrogen from a hydrogen outlet line. The method includes determining that water on trays in the gas hydrate column is saturated with $CO_2$ gas hydrates, closing valves on the feed gas line and the hydrogen outlet line, opening a valve leading to a carbon dioxide outlet line, lowering pressure in the gas hydrate column, and producing carbon dioxide from the carbon dioxide outlet line.

DETAILED DESCRIPTION

Embodiments described herein provide a hydrate based gas separation apparatus to separate $CO_2$ and $H_2$ from other gases. The technology uses a unique separation mechanism that is easy to regenerate and capable of separating gas mixture, which might not be achievable via conventional technologies.

Carbon dioxide, as a small nonpolar hydrocarbon, forms S1 hydrates with a formula of $CO_2 \cdot nH_2O$ (n=5.75) when contacted with water molecules below the equilibrium temperature and above the equilibrium pressure. Upon dissociation, one volume of $CO_2$ hydrates can release 175 volumes of $CO_2$ gas at standard temperature and pressure conditions, which is potentially useful for the separation of $CO_2$ from other gases.

Figure 1:
FIG. 1 is a drawing of a gas hydrate column (GHC) to separate $CO_2$ and $H_2$ from other gases.
Figure 1:
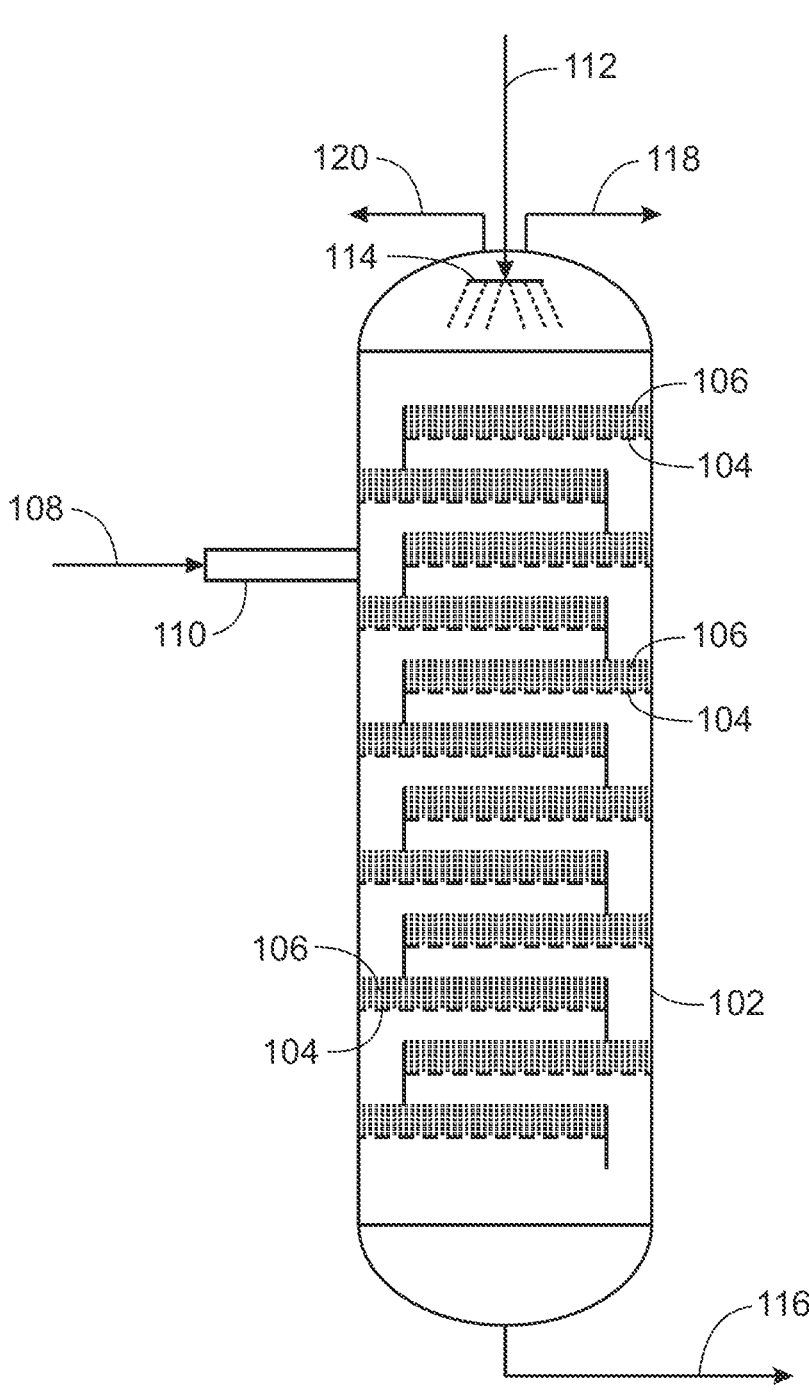

FIG. 1 is a drawing of a gas hydrate column (GHC) 100 to separate $CO_2$ and $H_2$ from other gases. The GHC 100 is a modified bubble tray column 102 that includes bubble trays 104 that are designed to maintain a level of water 106 on the bubble trays 104 to support gas hydrate formation. For example, the bubble trays 104 can be designed to keep the water level on each tray about 5 mm, 2 mm, or 1 mm below the top of the bubble cap height.

In some embodiments, the diameter to length ratio of a GHC used for hydrate-based gas separation may be in the range of about 0.01 to about 1.0, or about 0.05 to about 0.8, about 0). 1 to about 0.5, or about 0.2 to about 1.0. In some embodiments, the diameter to length ratio is about 0.1, about 0.2, about 0.4, or about 1.0.

In some embodiments, a feed gas stream 108 provided to the GHC 100 includes $CO_2$, $H_2$, and traces of other gases. The GHC 100 can separate gas mixtures that can include $CO_2/H_2$, $CO_2/N_2$, $CO_2/CH_4$, $CO_2/H_2S$, $CO_2$—$CH_4/H_2$, and $CO_2$—$H_2S/H_2$. To prepare for the hydrate formation, the feed gas stream 108 is compressed to a pressure of about 30 bar (3 MPa, 435.11 psi) to about 42.5 bar (4.25 MPa, 616.4 psi), or between about 30 bar and about 35 bar, or about 35 bar. Pressures higher than 42.5 bar may result in the $CO_2$ forming a solid or a liquid, which would interfere with the hydrate formation. After the compression, the feed gas stream 108 is chilled to a temperature between about 5° C. and about 15° C. or about 8° C. The GHC 100 is maintained at these pressures and temperatures during the formation of $CO_2$ hydrates, termed a pressurized stage herein.

The feed gas stream 108 is then injected into the GHC 100 through an inlet 110 between bubble trays 104. The inlet 110 can be placed to optimize the formation of the hydrates, based, at least in part, on the gas mixture. In some embodiments, the inlet 110 is placed in the GHC 100 below at least three bubble trays from the top of the GHC 100. In other embodiments, the inlet 110 is placed in the center of the GHC 100, A water stream 112 is injected into the top of the GHC 100 through a spray nozzle 114. The resulting water spray enhances the formation of the $CO_2$ hydrates. As $CO_2$ hydrates are generally formed at a water-gas interface, the water flow in the GHC 100 may sweep the $CO_2$ hydrates to lower levels in the GHC 100, freeing the upper levels of the GHC 100 for further formation of $CO_2$ hydrates. A promoter chemical can be added to the water stream 112 to enhance the formation of the $CO_2$ hydrates, for example, including chemical and kinetic promoters. In some embodiments, the promoter chemicals include cyclopentane, tetrahydrofuran, or tetra-n-butylammonium bromide, or any combination thereof, among others. In various embodiments, the promoter chemical is added at between 0) wt. % and about 0.5 wt. %, or between about 0.2 wt. % and about 0.7 wt. %, or between about 0.5 wt. % and about 1.0 wt. %. In various embodiments, the promoter chemical is added at less than about 1.0 wt. %, or less than about 0.7 wt. %, or less than about 0.5 wt. %, or less than about 0.2 wt. %, or lower. The determination of the amount of promoter chemical used is based, at least in part, on the concentration of $CO_2$ in the feed gas stream 108, the temperature of the GHC 100, the amount of other gases to be separated, and the like.

An excess water stream 116 is removed from an outlet at the bottom of the GHC 100. If a promoter chemical is used, it will exit the GHC 100 in the excess water stream 116. The promoter chemical may then be recovered and added back to the water stream 112 for reuse. In some embodiments, the excess water stream 116 is monitored for the presence of $CO_2$ hydrates, for example, using an optical particle detector to determine that particles are in the excess water stream 116. The concentration of $CO_2$ hydrates in the excess water stream 116 may then be used to determine when the GHC 100 has reached capacity. In some embodiments, the determination that the GHC 100 has reached capacity is made by measuring the concentration of $CO_2$ in the excess water stream 116, or by running the column in the pressurized mode for a predetermined interval of time, for example, determined by modeling.

During the formation of the $CO_2$ hydrates in the GHC 100 in the pressurized mode, a hydrogen stream 118 is removed from an outlet at the top of the GHC 100. The hydrogen stream 118 can then be provided to downstream units for further processing to remove any remaining impurities, such as an amine column to remove remaining amounts of $CO_2$, or a cryogenic purification system to separate other gases, such as nitrogen, from the hydrogen.

Once the GHC 100 has reached capacity of $CO_2$ hydrates, the outlet to the hydrogen stream 118 may be closed, for example, by an automated valve. The $CO_2$ is then recovered by depressurizing the GHC 100 to destabilize the $CO_2$ hydrates, termed the depressurization stage herein. In the depressurization stage, a $CO_2$ stream 120 is recovered through an outlet at the top of the GHC 100, for example, when an automated valve on the outlet is opened. The $CO_2$ stream 120 can then be provided to downstream units for further processing, sequestration, pipeline sales, or other uses. The depressurization happens at fixed temperature of 10° C., is performed by slowly bringing the pressure down up to about 100 psi. For example, the depressurization may be performed in two stages, to a first pressure of less than about 1000 psi which is held for about 5 minutes, 10 minutes, 20 minutes, or longer, before depressurizing to less than about 500 psi where $CO_2$ is in vapor (gas) state allowing the separation. The downstream unit then receives the $CO_2$ at a pressure of about 500 psi. In some embodiments, the $CO_2$ stream 120 is fed to adsorption columns, for example, based on zeolites or other molecular sieves, two separate $CO_2$ from any $CH_4$ that has been isolated by hydrate formation. For a gas mixture of $CO_2$ and $CH_4$, a mixed hydrate is formed. As the mixed gas hydrate is destabilized by lowering pressure at a fixed temperature or at ambient temperature. For example, during the separation of $CO_2$ and $CH_4$ from hydrogen, hydrogen will be separated and collected from the top, while $CO_2$ and $CH_4$ will form a mixed gas hydrate. During the depressurization, the mixed gas hydrate will destabilize and release the $CO_2$ and $CH_4$ as a mixed gas from the top. An adsorption column downstream of the gas hydrate column can be used separate the $CO_2$ and $CH_4$.

Figure 2:
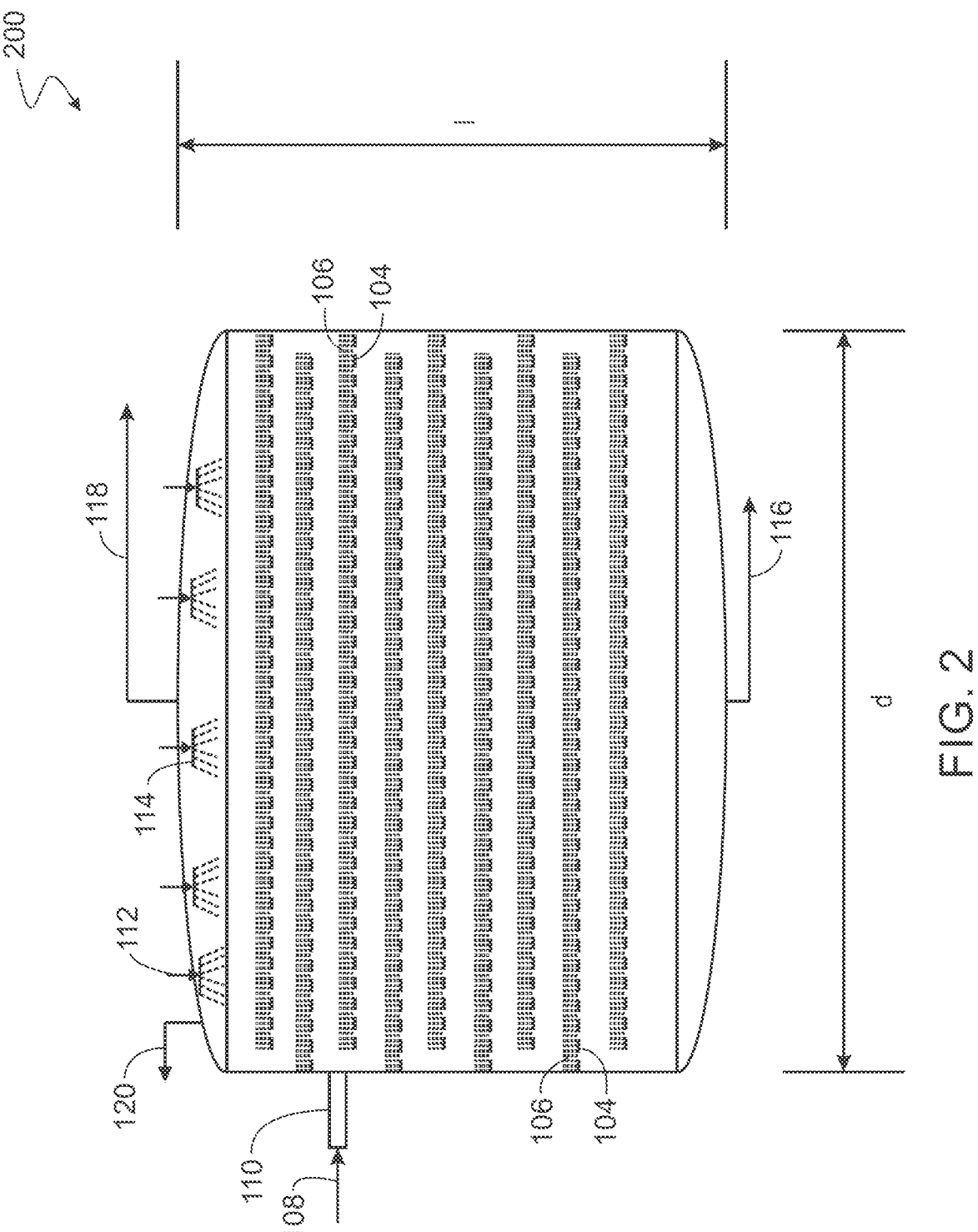
FIG. 2 is a drawing of another GHC for separating gases using gas hydrate technology.

FIG. 2 is a drawing of another GHC 200 for separating gases using gas hydrate technology. Like numbered items are as described with respect to FIG. 1. As shown in FIG. 2, a large cross-sectional area, with a high diameter (d) to length (l) ratio, increases the surface area of the water 106 on each of the bubble trays 104, increasing the hydrate formation. Thus, in some embodiments, the diameter to length ratio of the GHC 200 is between about 0.1 to about 4, or between about 0.2 and about 2, or about 2 or about 3.

Figure 3:
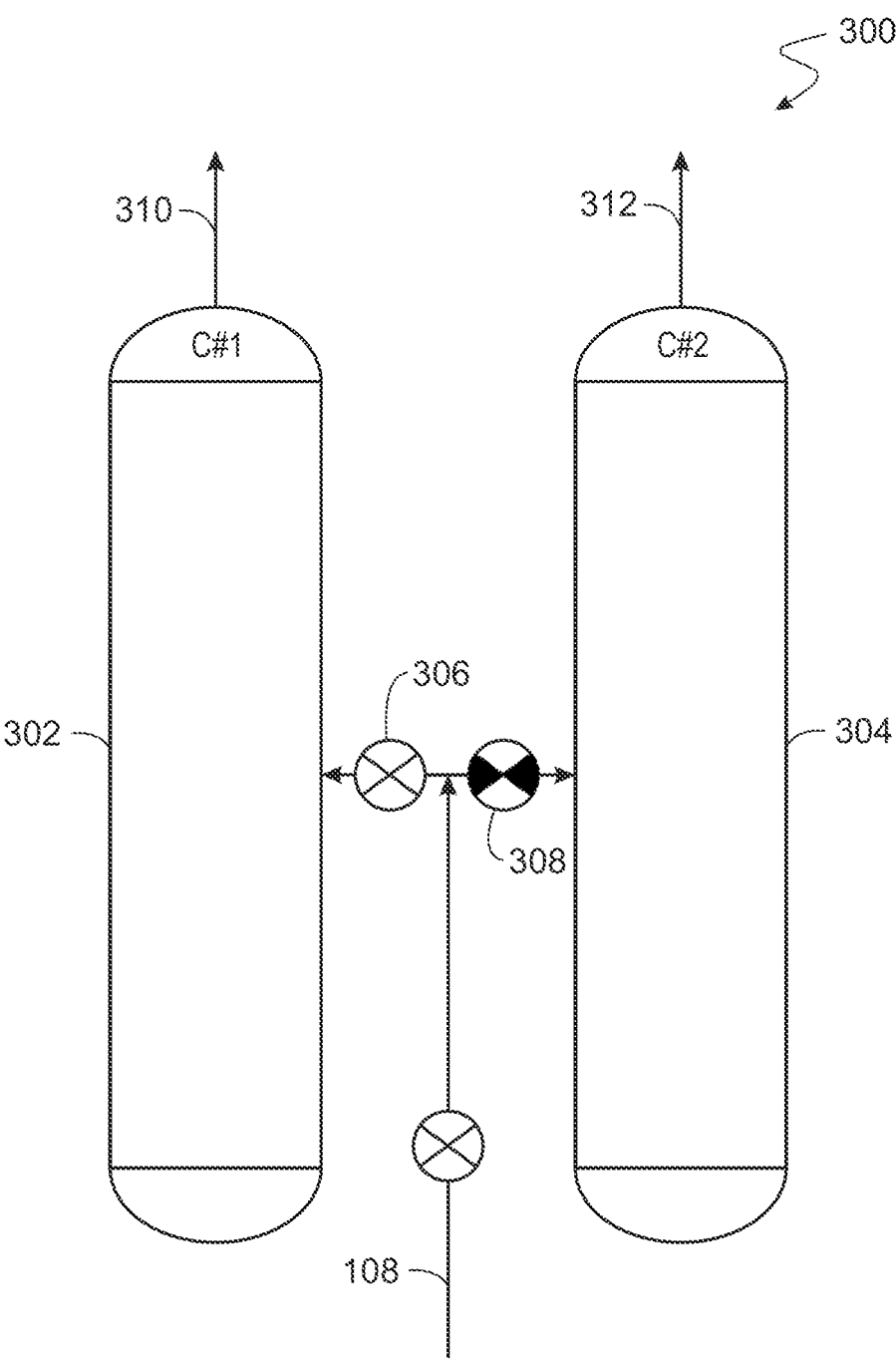
FIG. 3 is a drawing of a system that includes two gas-hydrate column columns for separating gases in alternating stages.

FIG. 3 is a drawing of a system 300 that includes two gas-hydrate columns 302 and 304 for separating gases in alternating stages. Like numbered items are as described with respect to FIG. 1. In this system 300, flow of the feed gas stream 108 is switched between the two columns using valves 306 and 308.

As shown in FIG. 3, in the first stage, the valve 306 leading to column 1 302 is open, while the valve 308 leading to column 2 304 is closed. During this stage, column 1 302 is kept at a pressure of between about 30 bar and 42.5 bar and a temperature of less than about 10° C. Accordingly, $CO_2$ hydrates are formed in column 1 302, and a hydrogen stream exits column 1 302 through an outlet 310 at the top of the column.

In this stage, column 2 304 is depressurized, e.g., to a pressure of less than about 5 bar and a temperature of greater than about 5° C. This allows $CO_2$ hydrates to decompose, with a $CO_2$ stream exiting through an outlet 312.

Once column 1 302 reaches capacity, the system 300 is switched to the second stage. In this stage, the flow of the feed gas stream 108 to column 1 302 is stopped by closing valve 306. Column 1 302 is then depressurized below about 5 bar, and the $CO_2$ released from the $CO_2$ hydrates as they decompose is captured in the $CO_2$ stream exiting the outlet 308.

During the release of the $CO_2$ from column 1 302, the flow of the feed gas stream 108 to column 2 304 is started by opening valve 308. Column 2 304 is then pressurized to between about 30 bar and about 42.5 bar, at a temperature of less than about 10° C. Accordingly, $CO_2$ hydrates are formed in column 2 304, and a hydrogen stream exits column 2 304 through the outlet 312 at the top of the column.

Figure 4:
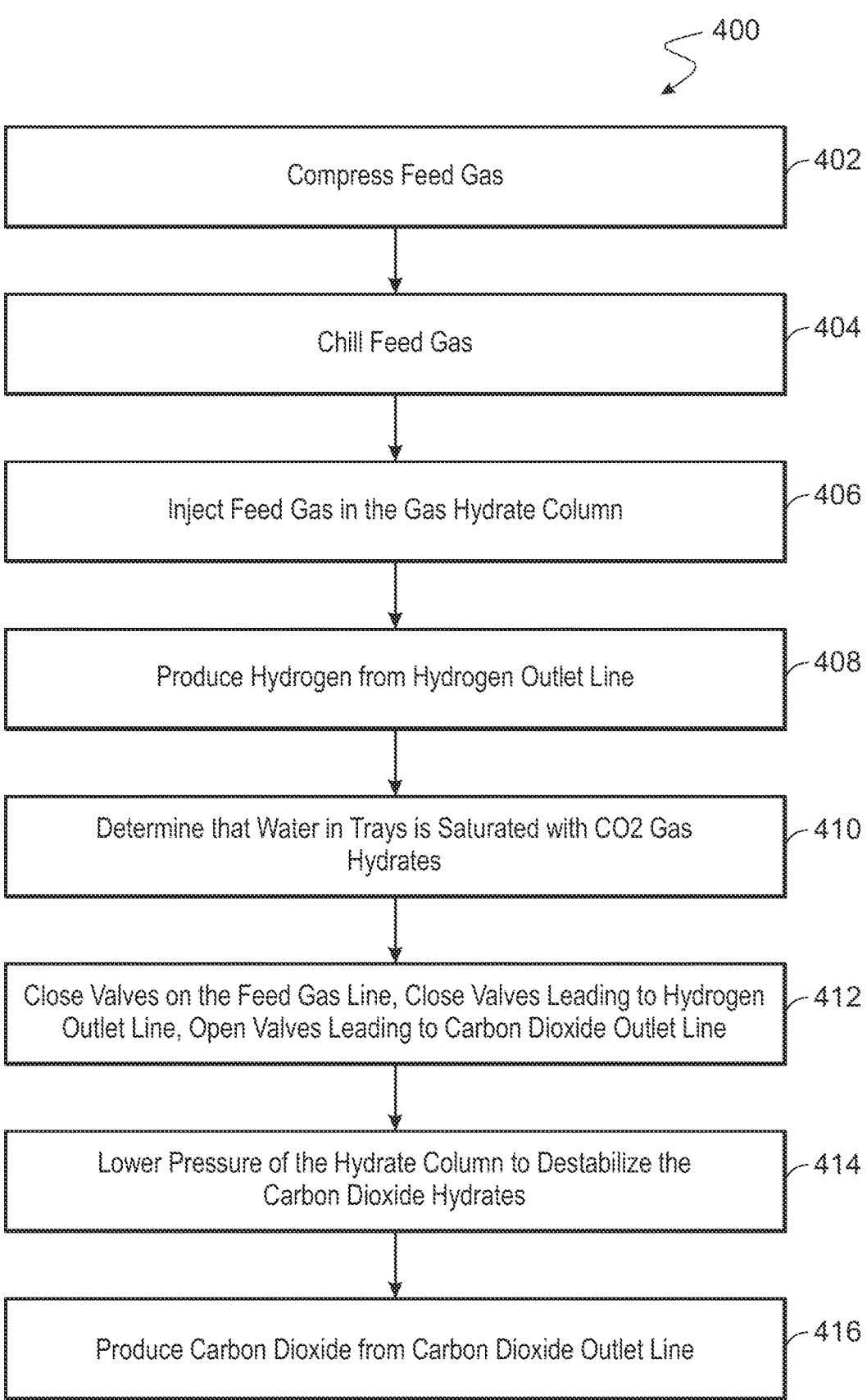
FIG. 4 is a process flow diagram of a method for separating gases using gas hydrate technology in a column.

Once column 2 304 is at capacity, e.g., saturated with $CO_2$ hydrates, the feed gas stream 108 is switched back to column 1 302 to repeat the cycle in the first stage. The two columns will be on alternate pressure and depressurization cycles to recover $H_2$ during pressurized cycle and $CO_2$ during depressurized cycle FIG. 4 is a process flow diagram of a method 400 for separating gases using gas hydrate technology in a gas hydrate column. The method begins at block 402, with the compression of the feed gas. As described herein, the feed gas is pressurized in a range of between about 30 bar (3 MPa) to about 42.5 bar (4.25 MPa), or between about 30 bar and about 40) bar, or between about 30 bar and 35 bar, or at about 30 bar, 35 bar, or 40 bar. Higher pressures may be more effective at forming $CO_2$ hydrates. However, the pressure is set below 42.5 bar to avoid the formation of solid or liquid $CO_2$.

At block 404, the feed gas is then chilled to a temperature between about 0° C. and 17° C., or between about 5° C. and 15° C., or between about 7° C. and 12° C. or about 7° C., about 8° C. or about 9° C. Lower temperatures may be more effective at forming $CO_2$ hydrates. However, these temperatures may result in the formation of solid or liquid $CO_2$ at higher pressures. Further, the temperature is maintained above 0° C.) to avoid the formation of water ice. While the feed gas may be chilled prior to the compression, generally the chilling is performed after compression to remove the heat of compression.

At block 406, the feed gas is injected into the gas hydrate column (GHC). The injection point, as described herein, may be at a level of lower than 3 trays from the top of the column. In some cases, the feed gas may be injected further down, such as the middle of the column, or towards the bottom of the column. This may be determined by the composition of the feed gas. For example, a $CO_2/H_2$ mixture may be injected towards the bottom of the GHC to maximize the time for the formation of the $CO_2$ hydrates. The $H_2$ and $CO_2$ mixture flows up through the GHC and $CO_2$ and contacts the water on bubble trays in the column to form the $CO_2$ hydrate. As described herein, the $CO_2$ hydrate formation can be expedited by adding certain types of $CO_2$ hydrate promoters such as surfactants, solvents, or polymers.

At block 408, a hydrogen stream is produced from a hydrogen outlet on the GHC. The process continues until, at block 410, it is determined that the water in the trays is saturated with $CO_2$ gas hydrates. As described herein, this may be performed by monitoring a water outlet from the GHC for the presence of hydrate crystals, $CO_2$, or both.

As determined at block 410, once the column reaches capacity, e.g., the trays are saturated with $CO_2$ gas hydrates, at block 412, valves leading to the hydrogen outlet line of the column are closed, and valves leading to the carbon dioxide output line are opened. At block 414, the pressure of the GHC is lowered, for example, to less than about 5 bar, which results in the destabilization of the $CO_2$ gas hydrates, and the release of $CO_2$. At block 416 carbon dioxide is produced from the carbon dioxide output line until all hydrates are degraded. At that point, the valves on the carbon dioxide output line are closed and valves on the hydrogen outlet line are opened. The feed gas is then injected into the column to restart the process. The method 400 can be implemented with two columns as described with respect to the system 300 of FIG. 3.

EMBODIMENTS

An embodiment described herein provides a gas hydrate column. The gas hydrate column includes a column shell to be pressurized in a first stage of operation and depressurized in a second stage of operation. Bubble trays are disposed vertically in the column shell, wherein the bubble trays are configured to hold a level of water on each of the bubble trays. The gas hydrate column includes a feed gas inlet to feed a gas mixture into the column shell, where in the gas mixture is compressed and chilled to form $CO_2$ hydrates in the water on the bubble trays. A gas outlet is included to release non-hydrate forming gases during the first stage of operation and a gas outlet to release hydrate-forming gases during the second stage of operation.

In an aspect, combinable with any other aspect, the gas hydrate column includes a water inlet disposed at a top of the column shell and a water outlet disposed at a bottom of the column shell.

In an aspect, combinable with any other aspect, water introduced into the water inlet includes a $CO_2$ hydrate promoter.

In an aspect, combinable with any other aspect, the $CO_2$ hydrate promoter includes cyclopentane, tetrahydrofuran, or tetra-n-butylammonium bromide, or any combination thereof.

In an aspect, combinable with any other aspect, the $CO_2$ hydrate promoter exits with water through the water outlet.

In an aspect, combinable with any other aspect, the $CO_2$ hydrate promoter is recovered from the water exiting through the water outlet.

In an aspect, combinable with any other aspect, the temperature of the column is between about 5° C. and about 10° C.

In an aspect, combinable with any other aspect, during the first stage of operation, the pressure of the gas hydrate column is between about 30 bar (3 megapascals, MPa) and about 42.5 bar (4.25 MPa).

In an aspect, combinable with any other aspect, during the second stage of operation, the pressure of the gas hydrate column is between about 0.1 bar and about 5 bar.

In an aspect, combinable with any other aspect, a diameter to length ratio of the gas hydrate column is between about 2 and about 3.

In an aspect, combinable with any other aspect, the gas mixture provided through the gas inlet is at a pressure of between about 30 bar and about 35 bar.

In an aspect, combinable with any other aspect, the gas mixture provided through the gas inlet is at a temperature of between about 5° C. and about 8° C.

In an aspect, combinable with any other aspect, the feed gas inlet is disposed below at least three bubble trays from the top of the gas hydrate column.

Another embodiment described herein, provides a method for separating $CO_2$ from a gas mixture using hydrates. The method includes injecting a feed gas into a gas hydrate column through a feed gas line and producing hydrogen from a hydrogen outlet line. The method includes determining that water on trays in the gas hydrate column is saturated with $CO_2$ gas hydrates, closing valves on the feed gas line and the hydrogen outlet line, opening a valve leading to a carbon dioxide outlet line, lowering pressure in the gas hydrate column, and producing carbon dioxide from the carbon dioxide outlet line.

In an aspect, combinable with any other aspect, the method includes injecting water into a water inlet line disposed proximate to the top of the gas hydrate column.

In an aspect, combinable with any other aspect, the method includes mixing a hydrate formation promoter into the water prior to injection.

In an aspect, combinable with any other aspect, the method includes recovering water from a water outlet line disposed proximate to the bottom of the gas hydrate column.

In an aspect, combinable with any other aspect, the method includes recovering the hydrate formation promoter from the water recovered from the water outlet line.

In an aspect, combinable with any other aspect, the method includes pressurizing the feed gas to between about 30 bar and about 35 bar.

In an aspect, combinable with any other aspect, the method includes chilling the feed gas to between about 5° C. and about 15° C.

In an aspect, combinable with any other aspect, the method includes lowering pressure in the gas hydrate column to between about 0.1 bar and 5 bar.

In an aspect, combinable with any other aspect, the method includes determining that $CO_2$ has stopped flowing from the gas hydrate column, closing the valve leading to the carbon dioxide outlet line, opening the valves on the feed gas line at the hydrogen outlet line, injecting the feed gas into a gas hydrate column through the feed gas line, and producing hydrogen from a hydrogen outlet line.

Other implementations are also within the scope of the following claims.

What is claimed is:

1. A gas hydrate column, comprising:
   a column shell to be pressurized in a first stage of operation and depressurized in a second stage of operation;
   bubble trays disposed vertically in the column shell, wherein the bubble trays are configured to hold a level of water on each of the bubble trays;
   a feed gas inlet to feed a gas mixture into the column shell, where in the gas mixture is compressed and chilled to form $CO_2$ hydrates in the water on the bubble trays;
   a gas outlet to release non-hydrate forming gases during the first stage of operation; and
   a gas outlet to release hydrate-forming gases during the second stage of operation.

2. The gas hydrate column of claim 1, comprising:
   a water inlet disposed at a top of the column shell; and
   a water outlet disposed at a bottom of the column shell.

3. The gas hydrate column of claim 2, wherein water introduced into the water inlet comprises a $CO_2$ hydrate promoter.

4. The gas hydrate column of claim 3, wherein the $CO_2$ hydrate promoter comprises cyclopentane, tetrahydrofuran, or tetra-n-butylammonium bromide, or any combination thereof.

5. The gas hydrate column of claim 3, wherein the $CO_2$ hydrate promoter exits with water through the water outlet.

6. The gas hydrate column of claim 5, wherein the $CO_2$ hydrate promoter is recovered from the water exiting through the water outlet.

7. The gas hydrate column of claim 1, wherein the temperature of the column is between about 5° C. and about 10° C.

8. The gas hydrate column of claim 1, wherein, during the first stage of operation, the pressure of the gas hydrate column is between about 30 bar (3 megapascals, MPa) and about 42.5 bar (4.25 MPa).

9. The gas hydrate column of claim 1, wherein, during the second stage of operation, the pressure of the gas hydrate column is between about 0.1 bar and about 5 bar.

10. The gas hydrate column of claim 1, wherein a diameter to length ratio of the gas hydrate column is between about 2 and about 3.

11. The gas hydrate column of claim 1, wherein the gas mixture provided through the feed gas inlet is at a pressure of between about 30 bar and about 35 bar.

12. The gas hydrate column of claim 1, wherein the gas mixture provided through the feed gas inlet is at a temperature of between about 5° C. and about 8° C.

13. The gas hydrate column of claim 1, wherein the feed gas inlet is disposed below at least three bubble trays from the top of the gas hydrate column.

14. A method for separating $CO_2$ from a gas mixture using hydrates, comprising:
   injecting a feed gas into a gas hydrate column through a feed gas line;
   producing hydrogen from a hydrogen outlet line;
   determining that water on trays in the gas hydrate column is saturated with $CO_2$ gas hydrates;
   closing valves on the feed gas line and the hydrogen outlet line;
   opening a valve leading to a carbon dioxide outlet line;
   lowering pressure in the gas hydrate column; and
   producing carbon dioxide from the carbon dioxide outlet line.

15. The method of claim 14, comprising, after injecting the feed gas, injecting water into a water inlet line disposed proximate to the top of the gas hydrate column.

16. The method of claim 15, comprising mixing a hydrate formation promoter into the water prior to injection.

17. The method of claim 14, comprising recovering water from a water outlet line disposed proximate to the bottom of the gas hydrate column, wherein the water from the water outlet line is monitored to determine that the water on the trays in the gas hydrate column is saturated with $CO_2$ gas hydrates.

18. The method of claim 16, comprising recovering the hydrate formation promoter from the water recovered from the water outlet line.

19. The method of claim 14, comprising pressurizing the feed gas to between about 30 bar and about 35 bar.

20. The method of claim 14, comprising chilling the feed gas to between about 5° C. and about 15° C.

21. The method of claim 14, wherein the pressure in the gas hydrate column is lowered to between about 0.1 bar and 5 bar.

22. The method of claim 14, comprising:
   determining that $CO_2$ has stopped flowing from the gas hydrate column;
   closing the valve leading to the carbon dioxide outlet line;
   opening the valves on the feed gas line at the hydrogen outlet line;
   injecting the feed gas into the gas hydrate column through the feed gas line; and
   producing hydrogen from the hydrogen outlet line.

* * * * *